United States Patent
Edmond et al.

(10) Patent No.: US 9,557,204 B2
(45) Date of Patent: Jan. 31, 2017

(54) METERING APPARATUS FOR AND METHOD OF DETERMINING A CHARACTERISTIC OF A FLUID FLOWING THROUGH A PIPE

(71) Applicant: AIRBUS OPERATIONS LIMITED, Bristol (GB)

(72) Inventors: George Edmond, Bristol (GB); Rhona Whitlock, Bristol (GB); Robert Case, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 15/163,866

(22) Filed: May 25, 2016

(65) Prior Publication Data
US 2016/0349092 A1    Dec. 1, 2016

(30) Foreign Application Priority Data

May 29, 2015 (GB) ..................................... 1509319

(51) Int. Cl.
*G01F 1/84* (2006.01)
*G01F 1/88* (2006.01)

(52) U.S. Cl.
CPC ..................... *G01F 1/88* (2013.01)

(58) Field of Classification Search
CPC .............. G01F 1/78; G01F 1/50; G01F 1/84; G01L 13/00; G01L 7/02; B21D 7/14
(Continued)

(56) References Cited

U.S. PATENT DOCUMENTS

| 2,897,672 A | 8/1959 | Glasbrenner et al. |
| 4,738,140 A * | 4/1988 | Kempf ................. G01L 9/0002 73/730 |

(Continued)

FOREIGN PATENT DOCUMENTS

| EP | 2913642 A1 | 9/2015 |
| JP | H0979881 A | 3/1997 |

(Continued)

OTHER PUBLICATIONS

Search Report dated Nov. 5, 2015 in Great Britain Application No. 1509319.8.

*Primary Examiner* — Jewel V Thompson
(74) *Attorney, Agent, or Firm* — Hauptman Ham, LLP

(57) ABSTRACT

A metering apparatus for determining a characteristic of a fluid, such as the volumetric flow rate, flowing through a non-linear section of a pipe is disclosed having a first strain gauge mountable to the non-linear section of the pipe offset from the bending neutral axis of the non-linear section of the pipe, to detect a bending force on the non-linear section of the pipe induced by the inertia of the fluid flowing through the pipe. A second strain gauge is mountable to the pipe disposed on the bending neutral axis of the non-linear section of the pipe, to detect at least one of the hoop strains, longitudinal strains and radial strains imparted on the pipe by the pressure of the fluid flowing through the pipe. A controller is configured to determine the mass flow rate of fluid flowing through the pipe based on the bending force determined by the first strain gauge and the at least one of the hoop strains, longitudinal strains and radial strains determined by the second strain gauge.

20 Claims, 4 Drawing Sheets

(58) Field of Classification Search
USPC ............. 73/861.351, 861.355, 730; 72/31.04
See application file for complete search history.

(56) References Cited

U.S. PATENT DOCUMENTS

| | | | |
|---|---|---|---|
| 4,843,887 A * | 7/1989 | Engeler | G01L 23/24 73/114.51 |
| 5,505,092 A * | 4/1996 | Kowalski | G01L 9/0002 338/4 |
| 7,249,525 B1 | 7/2007 | Engel | |
| 7,500,404 B2 * | 3/2009 | Yamane | G01F 1/206 73/861.355 |
| 8,708,602 B2 * | 4/2014 | Critsinelis | F16L 1/24 405/158 |
| 2003/0200816 A1 | 10/2003 | Francisco, Jr. | |
| 2007/0186603 A1 * | 8/2007 | Hogendoorn | B21D 9/16 72/31.04 |
| 2007/0193371 A1 | 8/2007 | Yamane et al. | |
| 2015/0253170 A1 | 9/2015 | Kosaka et al. | |

FOREIGN PATENT DOCUMENTS

| | | |
|---|---|---|
| JP | 2010066184 A | 3/2010 |
| WO | 97/02470 A1 | 1/1997 |

\* cited by examiner

METERING APPARATUS FOR AND METHOD OF DETERMINING A CHARACTERISTIC OF A FLUID FLOWING THROUGH A PIPE

RELATED APPLICATIONS

The present application claims priority from Great Britain Application Number 1509319.8, filed May 29, 2015, the disclosure of which is hereby incorporated by reference herein in its entirety.

FIELD OF THE INVENTION

The present invention relates to a metering apparatus for determining a characteristic of a fluid flowing through a non-linear section of a pipe. The present invention also relates to a method of determining a characteristic of a fluid flowing through a non-linear section of a pipe.

BACKGROUND OF THE INVENTION

An aircraft 10 is shown in FIG. 1. Such an aircraft has a number of fluid systems, including a fuel system 20. The fuel system 20 has fuel tanks 21, 22 and conduits 23 for transferring fuel around the aircraft. Conduits 23 supply fuel to the aircraft's engines 24. Conduits 23 also transfer fuel between fuel tanks 21, 22. Such fuel transfer between fuel tanks 21, 22 affects the weight distribution of the aircraft 10. Therefore, it is important to establish the fluid volume in each fuel tank 21, 22.

It is known to measure the fluid volume in the fuel tanks 21, 22, using depth gauges at various locations to establish the fuel volume.

Alternatively, or in addition to, measuring the fluid volume in each fuel tank 21, 22, it is known to measure the volumetric flow of fuel along the conduits 23 between fuel tanks 21, 22.

Known methods of measuring volumetric fluid flow through a conduit include use of differential pressure flow meters, pitot tubes flow meters, thermal flow meters, coriolis flow meters and mass flow meters.

Differential pressure flow meters measure the pressure drop over an obstruction or restriction along the flow path of fluid flow to be measured. Pressure readings are taken upstream and downstream of the obstruction or restriction. Using the determined pressure drop and Bernoulli's flow equation, the fluid flow is calculated.

The presence of an obstruction or restriction in the flow path to obtain a pressure drop reduces the efficiency of the flow circuit. Furthermore, the obstruction or restriction may trap contaminates, such as ice, and lead to the meter producing a false reading. The obstruction or restriction may also disrupt and change the fluid flow characteristics.

Pitot tube flow meters measure the fluid flow velocity by converting the kinetic energy of the flow into potential energy. However, this also requires an obstacle in the flow path. Such an arrangement is also not suitable in some fluid systems, such as fuel systems.

Thermal flow meters use the calorimetric principle for fluid flow measurement based on two temperature sensors in close contact with the fluid but thermally insulated from each other. However, an obstacle is present in the flow path. Furthermore, the use of a heated ignition source is not acceptable for some fluid systems, such as fuel systems.

Coriolis flow meters use the Coriolis effect to measure the mass moving through a section. The fluid to be measured passes through a U-shaped tube that is caused to vibrate in an angular harmonic oscillation. Due to the Coriolis forces, the tubes will deform and an additional vibration component will be added to the oscillation. This additional component causes a phase shift on some places of the tubes which can be measured with sensors. However, such an arrangement is not suitable for aircraft and requires moving parts.

U.S. Pat. No. 2,897,672 A describes a flow meter which determines fluid flow by measuring the fluid inertia of fluid exiting a jet nozzle into a pipe of increased diameter. However, such a metering arrangement is present in the fluid flow and has a significant step change in flow section as the fluid translates through the jet nozzle and so induces a significant pressure drop. Furthermore, the sensors are exposed to the fluid and the fluid flow is single directional, i.e. out of the jet nozzle.

SUMMARY OF THE INVENTION

According to a first aspect of the invention there is provided a metering apparatus for determining a characteristic of a fluid flowing through a non-linear section of a pipe, the metering apparatus comprising a first strain gauge mountable to the non-linear section of the pipe offset from the bending neutral axis of the non-linear section of the pipe, configured to detect a strain indicative of a bending force on the non-linear section of the pipe induced by the inertia of the fluid flowing through the pipe, a second strain gauge mountable to the pipe on the bending neutral axis of the non-linear section of the pipe, configured to detect at least one of the hoop strains, longitudinal strains and radial strains imparted on the pipe by the pressure of the fluid flowing through the pipe, a controller configured to determine the mass flow rate of fluid flowing through the pipe based on the bending force determined by the first strain gauge and the at least one of the hoop strains, longitudinal strains and radial strains determined by the second strain gauge.

With this arrangement it is possible to determine the mass flow rate of the fluid flowing through the pipe without interrupting or interfering with the flow of fluid through the pipe.

It is possible to easily determine the bending force on the non-linear section of the pipe induced by the inertia of the fluid flowing through the pipe.

The second strain gauge is not influenced by the bending force on the non-linear section of the pipe induced by the inertia of the fluid flowing through the pipe.

The controller may be configured to determine the volumetric flow rate of fluid flowing through the pipe based on the determined mass flow rate of fluid flowing through the pipe and the density of the fluid flowing through the pipe.

Therefore, it is possible to obtain dynamic readings of the volumetric flow rate of fluid flowing through the pipe based on a metering apparatus located external to the pipe.

The controller may be configured to determine the pressure of the fluid flowing through the pipe based on the at least one of the hoop strains, longitudinal strains and radial strains determined by the second strain gauge.

With this arrangement it is possible to determine the pressure of the fluid flowing through the pipe using a metering apparatus external to the pipe itself.

The metering apparatus may further comprise a temperature sensor. The controller may be configured to determine the density of the fluid flowing through the pipe based on the temperature detected by the temperature sensor and the pressure of the fluid flowing through the pipe.

Therefore, it is possible to dynamically determine the density of the fluid flowing through the pipe.

The first strain gauge may be mountable to an outer surface of the pipe. The second strain gauge may be mountable to an outer surface of the pipe. Therefore, metering system may be retrofitted to an existing fluid system.

The first strain gauge may comprise a first strain gauge element and a second strain gauge element.

The first and second strain gauge elements may be aligned in series along the longitudinal axis of the non-linear section of the pipe.

The first and second strain gauge elements may be spaced apart from each other.

The fluid may be a liquid, and optionally a fuel.

The metering apparatus may further comprise a user feedback arrangement.

The controller may be configured to determine fluctuations in the mass flow rate of fluid flowing through the pipe and to operate the user feedback arrangement when fluctuations are determined.

The metering apparatus may further comprise a structural isolating arrangement configured to isolate the non-linear section of the pipe from external bending forces.

According to another aspect of the invention, there is provided a fluid system further comprising a metering apparatus as described above.

According to another aspect of the invention, there is provided an aircraft further comprising a metering apparatus as described above.

According to another aspect of the invention, there is provided a method of determining a characteristic of a fluid flowing through a non-linear section of a pipe, the method comprising determining the strain acting on the pipe at a region offset from the bending neutral axis of the pipe, determining the strain acting on the pipe at a region along the bending neutral axis of the pipe, determining the bending force induced on the non-linear section of the pipe due to the inertia of fluid flowing through the pipe based on the strain acting on the pipe at a region offset from the bending neutral axis of the pipe and the strain acting on the pipe at a region along the bending neutral axis of the pipe.

The method may further comprise determining the mass flow rate of fluid flowing through the pipe based on the bending force induced on the non-linear section of the pipe due to the inertia of fluid flowing through the pipe.

The method may further comprise determining the pressure of the fluid flowing through the pipe based on the strain acting on the pipe at a region along the bending neutral axis of the pipe.

The method may further comprise determining the volumetric flow rate of fluid flowing through the pipe based on the mass flow rate of fluid flowing through the pipe and the density of the fluid flowing through the pipe.

The method may further comprise determining the temperature of the fluid flowing through the pipe, and determining the density of the fluid flowing through the pipe based on the temperature of the fluid and the pressure of the fluid flowing through the pipe.

The method may further comprise determining fluctuations in the bending force induced on the non-linear section of the pipe due to the inertia of fluid flowing through the pipe, and determining the presence of contaminants in fluid flowing through the pipe based on fluctuations in the bending force induced on the non-linear section of the pipe due to the inertia of fluid flowing through the pipe.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
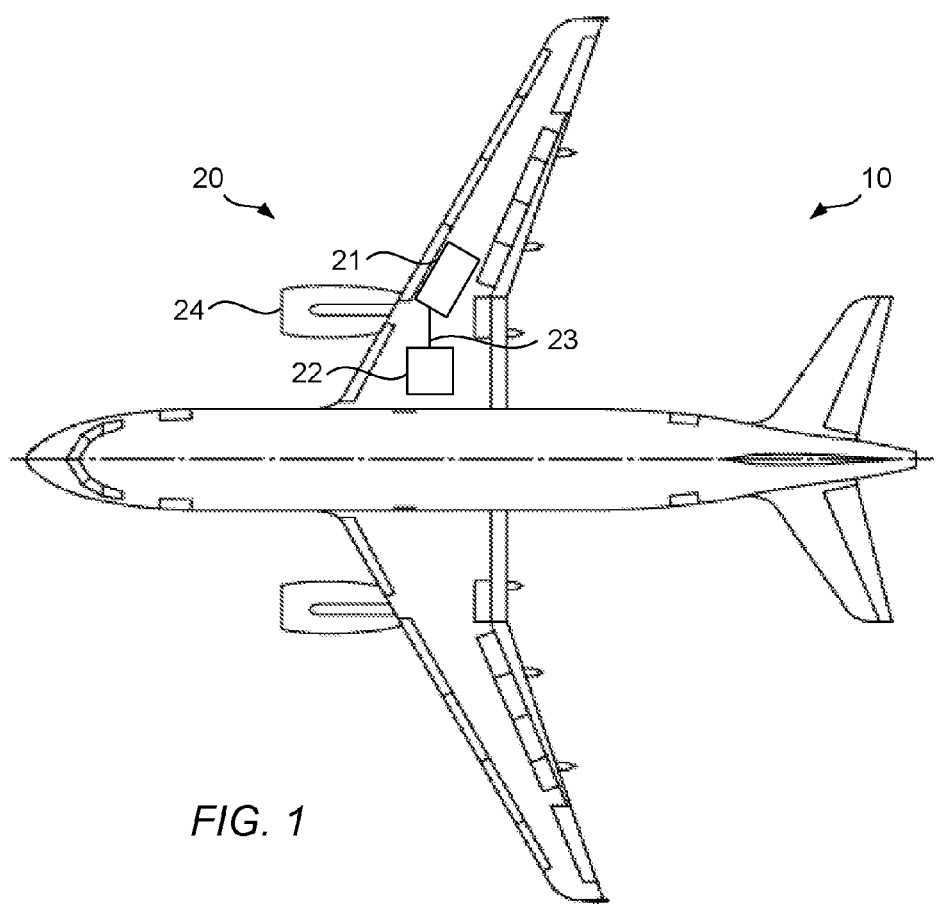
FIG. 1 is a schematic view of an aircraft with an aircraft fuel system.
Figure 2:
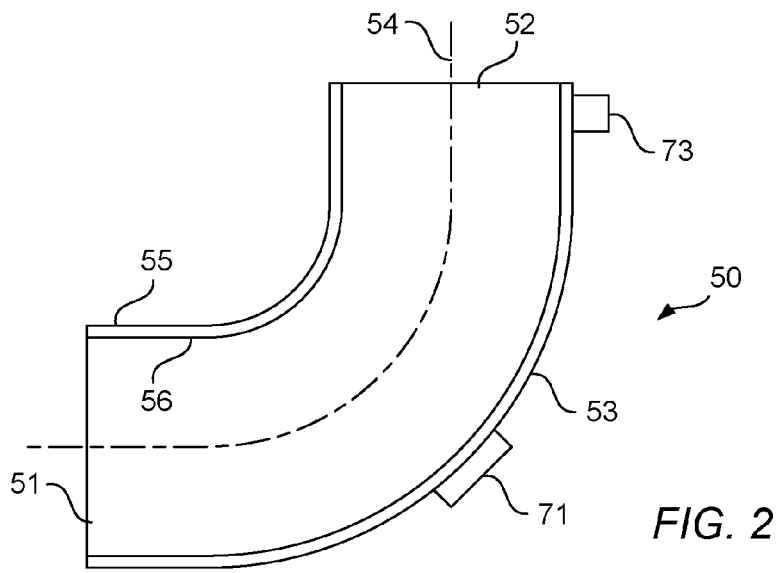
FIG. 2 is a schematic cross-sectional side view of a non-linear section of a pipe of an aircraft fuel system with an embodiment of the metering apparatus according to the invention.
Figure 3:
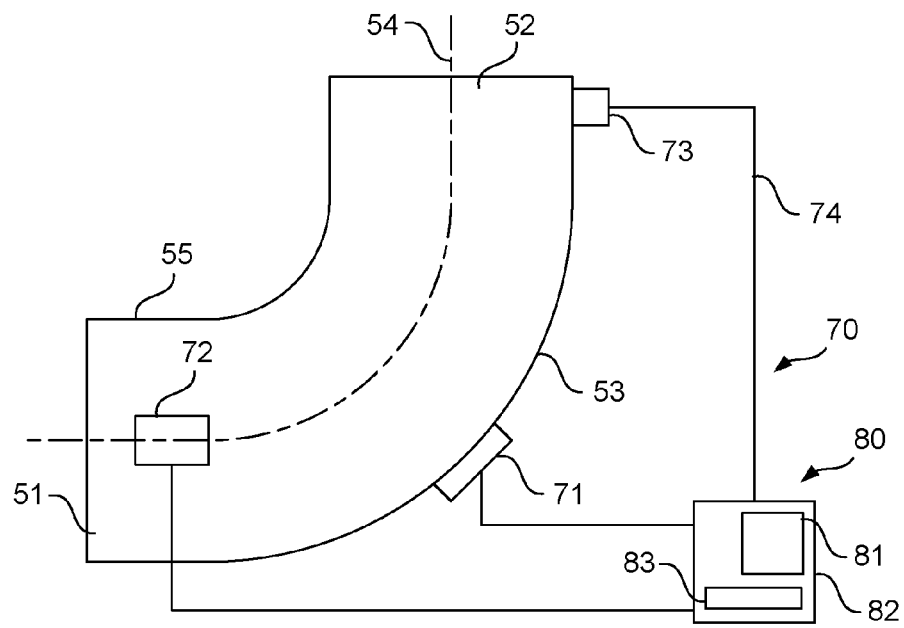
FIG. 3 is a schematic side view of the non-linear section of a pipe of the aircraft fuel system with the metering apparatus as shown in FIG. 2.

Part of an aircraft fuel system 40 is shown in FIG. 2 and FIG. 3. The part of the aircraft fuel system 40 includes a non-linear section of a pipe 50. Although in embodiments described herein the invention is described with reference to an aircraft fuel system, it will be understood that the invention may also be applicable to alternative fluid systems on an aircraft, for example a hydraulic system. Similarly, the invention may be applicable to a fluid system on other vehicular applications or non-vehicular systems.

The non-linear section of the pipe 50 has a first end 51 and a second end 52. The first end 51 acts as a fluid inlet or fluid outlet to the non-linear section of the pipe 50, dependent on the direction of fluid flow. The second end 52 acts as a fluid inlet or fluid outlet to the non-linear section of the pipe 50, dependent on the direction of fluid flow.

In the present embodiment, the non-linear section of the pipe 50 is shown with linear portions at the first and second ends 51, 52 and an angular portion 53 inbetween. However, it will be understood that the linear portions may be omitted.

The non-linear section of the pipe 50 has a neutral bending axis 54, represented by a dashed line in FIG. 2. The pipe 50 has an outer surface 55 and an inner surface 56. The pipe 50 has a fluid passageway along which fluid flows. The inner surface 56 defines the fluid passageway.

The non-linear section of the pipe 50 shown in FIG. 2 and FIG. 3 has a 90 degree bend. However, it will be understood that the specific arrangement of the non-linear section of the pipe 50 is not limited thereto. For example, the angle of the bend in the pipe 50 may differ from that shown, such that the non-linear section of the pipe 50 has a 45 degree bend, for example.

A metering apparatus 60 is shown in FIGS. 2 and 3. The metering apparatus 60 is configured to determine the volumetric flow rate of fluid flowing through the pipe 50. The metering apparatus 60 is also configured to determine one or more other characteristics of the fluid flowing through the pipe 50. In embodiments, the metering apparatus 60 does not determine the volumetric flow rate of fluid flowing through the non-linear section of the pipe 50.

The metering apparatus 60 comprises a sensor arrangement 70 and a main unit 80. The sensor arrangement 70 comprises a first strain gauge 71 and a second strain gauge 72.

The sensor arrangement 70 also comprises a temperature sensor 73. In some embodiments, the temperature sensor 73 is omitted.

The first strain gauge 71 is mounted to the outer surface 55 of the pipe 50. It will be understood that the first strain gauge 71 does not impart any influence on fluid flow through the pipe 50. The first strain gauge 71 is mounted to the angular portion 53 of the non-linear section of the pipe 50. The first strain gauge 71 is mounted midway along the angular portion 53 of the non-linear section of the pipe 50. The first strain gauge 71 is offset from the bending neutral axis 54 of the pipe 50. In the present embodiment, the first strain gauge 71 is disposed on the outer radius of the angular portion 53 of the non-linear section of the pipe 50. Therefore, the first strain gauge 71 is disposed at a region of maximum tensile loading. Alternatively, the first strain gauge 71 is disposed on the inner radius of the angular portion 53 of the non-linear section of the pipe 50, such that the first strain gauge 71 is disposed at a region of maximum compressive loading.

The first strain gauge 71 is mounted to the outer surface 55 of the pipe by known means, such as an adhesive.

The second strain gauge 72 is mounted to the outer surface 55 of the pipe 50. It will be understood that the second strain gauge 72 does not impart any influence on fluid flow through the pipe 50. The second strain gauge 72 is mounted at the first end 51 of the non-linear section of the pipe 50, although the positioning of the second strain gauge 72 may differ. The second strain gauge 72 is disposed on the bending neutral axis 54 of the pipe 50. Therefore, the second strain gauge 72 is not subject to bending forces imparted due to the inertia of fluid flowing through the pipe 50.

The second strain gauge 72 is mounted to the outer surface 55 of the pipe 50 by known means, such as an adhesive.

It will be noted that the first and second strain gauges 71, 72 are spaced from each other due to the second strain gauge 72 being disposed on the bending neutral axis of the pipe 50, and the first strain gauge 71 being offset from the bending neutral axis of the pipe 50. However, it should be understood that the relative positions may vary.

Figure 4:
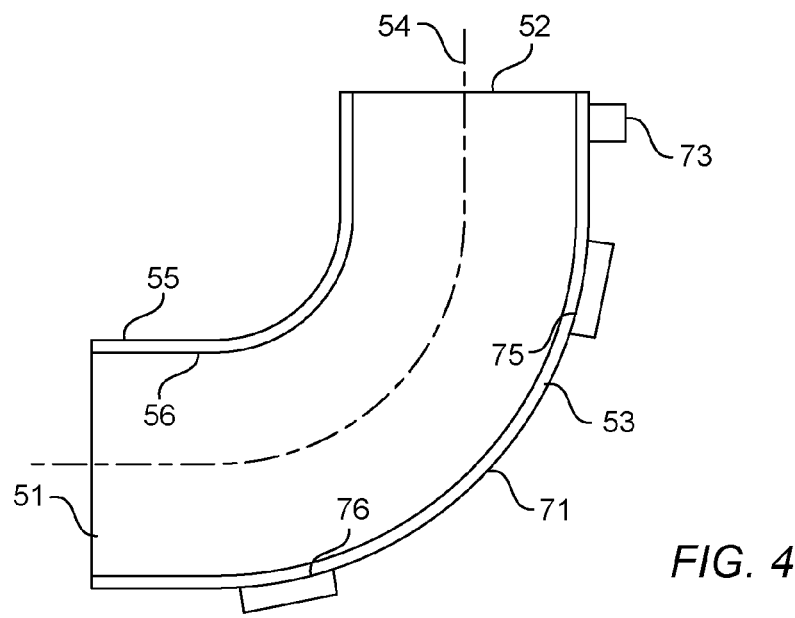
FIG. 4 is a schematic cross-sectional side view of a non-linear section of a pipe of an aircraft fuel system with another embodiment of the metering apparatus according to the invention.

Alternative arrangements of the first and second strain gauges 71, 72 are possible. It will be understood that each of the first and second strain gauges 71, 72 may comprise two or more strain gauge elements. For example, the first strain gauge 71 may comprise two strain gauge elements disposed adjacent to each other in a strain gauge unit. Alternatively, referring to FIG. 4 and FIG. 5, the first strain gauge 71 comprises a first strain gauge element 75 and a second strain gauge element 76 spaced from each other. These two strain gauge elements 75, 76 are configured to each detect strain acting on the pipe 50. By detecting the strain acting on the pipe 50 at two different regions offset from the bending neutral axis 54 of the pipe 50 it is possible to maximise the accuracy of the determined readings.

The metering apparatus 60 has a temperature sensor 73. The temperature sensor 73 is configured to determine the temperature of the fluid flowing through the pipe 50. The temperature sensor 73 is shown in FIG. 2 and FIG. 3 mounted to the outer surface 55 of the pipe 50. However, it will be understood that the location of the temperature sensor 73 is not limited thereto. For example, the temperature sensor 73 may be spaced from the pipe 50 to detect the ambient air temperature around the pipe 50. This will provide an indication of the temperature of the fluid in the pipe 50.

The information determined by the strain gauges 71, 72 and the temperature sensor 73 is communicated via communication means, such as electrical wires 74. However, it will be understood that alternative communication means, such as wireless transmitters and receivers may be used.

As shown in FIG. 3, the metering apparatus 60 includes a controller 81. The controller 81 has a computer memory 82. The controller 81 may include a separate storage unit 83, or the storage unit may be incorporated within the computer memory 82. The storage unit 83 may be, for example, a hard drive or disk drive that stores programs and data, and the storage unit 83 stores a program embodying steps and methods set forth below. It should be understood that the program could be broken into subprograms and stored in storage units of separate computers and that data could be transferred between those storage units using methods known in the art.

The controller 81 is in the main unit 80. The main unit 80 and sensor arrangement 70 may be enclosed in a single unit or be disposed in multiple units. The metering apparatus 60 may be easily fitted or retro-fitted to the pipe 50.

During use fluid, in this case aviation fuel, is fed along the pipe 50. It will be understood that the fluid may flow in either direction through the pipe 50. That is, fluid may be fed from the first end 51 to the second end 52 of the non-linear section of the pipe 50, and from the second end 52 to the first end 51 of the non-linear section of the pipe 50.

As fluid flows through the pipe 50, the fluid has inertia which acts on the pipe 50. It has been surprisingly found that it was possible to determine changes in the bending force induced on the pipe due to the inertia of the fluid using strain gauges.

When fluid flows along the pipe 50, a bending force is induced in the pipe 50 due to the change in inertia as the fluid changes direction as the fluid passes along the non-linear section of the pipe 50. The bending force induced is dependent on the characteristics of the fluid flow, such as pressure, density and mass flow rate.

The bending force induced in the pipe is detected by the first strain gauge 71. The second strain gauge 72 does not detect a bending force due to the positioning of the second strain gauge 72 on the neutral bending axis 54 of the non-linear section of the pipe 50.

The pressure of the fluid in the pipe 50 is detected by the second strain gauge 72. The second strain gauge 72 detects hoop strains, longitudinal strains and/or radial strains. These are induced in the pipe 50 due to the pressure of the fluid in the pipe 50. No strain resulting from the bending force is measured by the second strain gauge 72. Therefore, the controller 81 is configured to determine the pressure of the fluid in the pipe 50 based on the hoop strains, longitudinal strains and/or radial strains detected by the second strain gauge 72.

The first strain gauge 71 will also detect strain resulting from hoop strains, longitudinal strains and/or radial strains. Therefore, the controller 81 is configured to discount the strain resulting from the hoop strains, longitudinal strains and/or radial strains by discounting the strain detected by the second strain gauge 72 from the strain detected by the first strain gauge 71. This enables the accuracy of the determined bending force to be improved.

Figure 5:
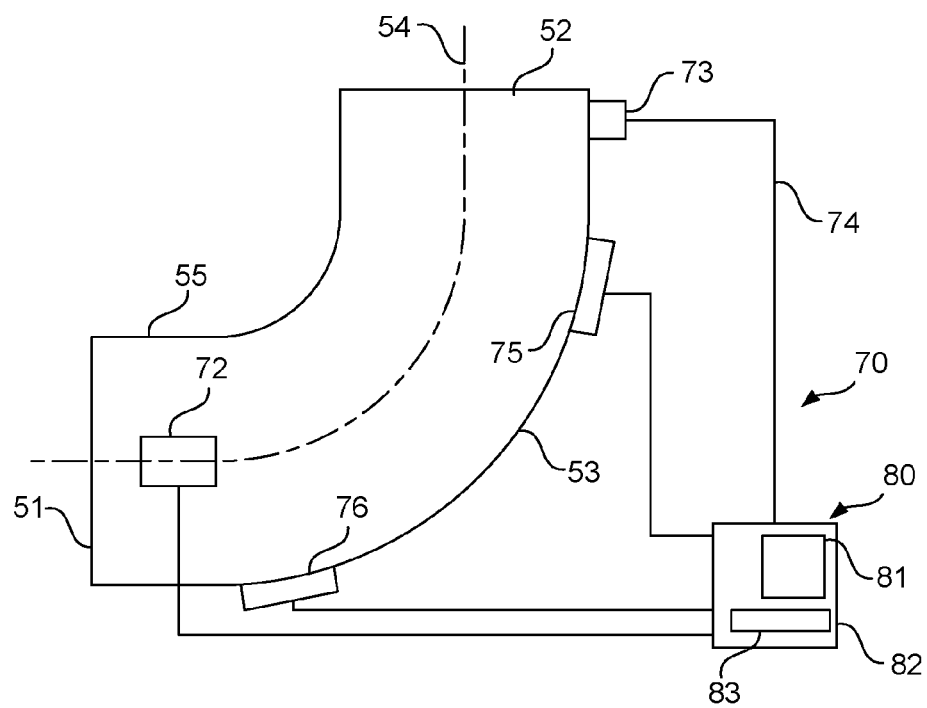
FIG. 5 is a schematic side view of the non-linear section of a pipe of the aircraft fuel system with the metering apparatus as shown in FIG. 4.
Figure 6:
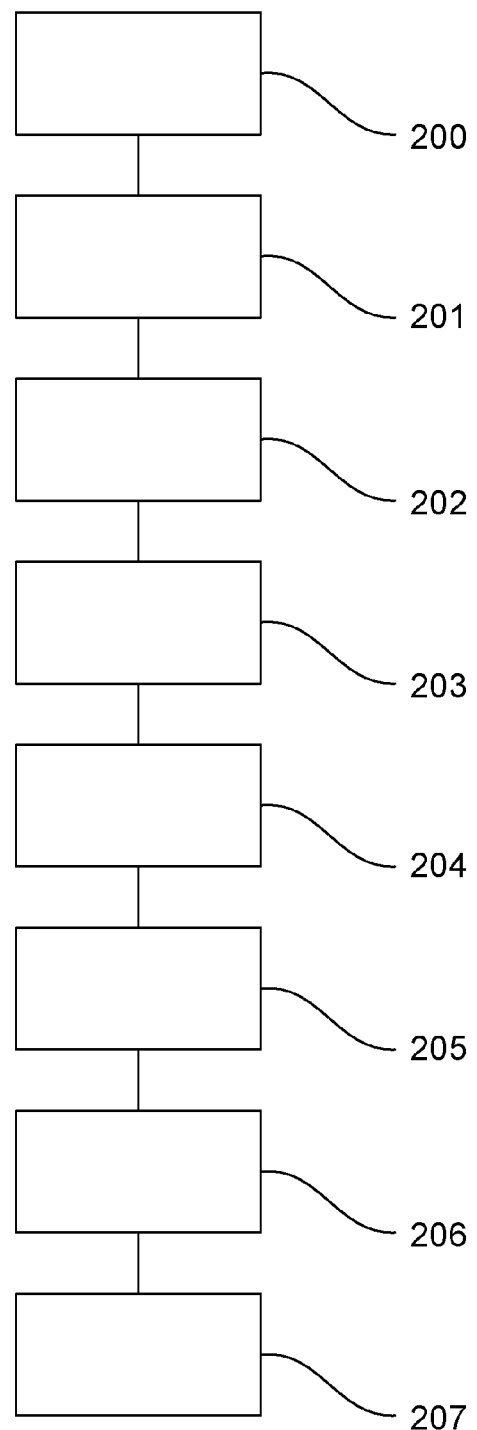
FIG. 6 is a flow diagram of a method of determining the volumetric flow rate of a fluid flowing through the non-linear section of the pipe according to the invention.

Referring to FIG. 5, a method of determining a characteristic of a fluid flowing through the non-linear section of the pipe 50 is described.

At step 200, the strain acting on the pipe at a region offset from the bending neutral axis 54 of the pipe 50 is determined. The strain acting on the pipe 50 at a region offset from the bending neutral axis of the pipe is determined with the first strain gauge 71.

At step 201, the strain acting on the pipe 50 at a region along the bending neutral axis 54 of the pipe 50 is determined. The strain acting on the pipe 50 at a region offset from the bending neutral axis 54 of the pipe 50 is determined with the second strain gauge 72.

At step 202, the bending force induced on the non-linear section of the pipe 50 due to the inertia of fluid flowing through the pipe 50 is determined. The bending force induced on the non-linear section of the pipe 50 due to the inertia of fluid flowing through the pipe is determined by comparing the strain acting on the pipe 50 at a region offset from the bending neutral axis of the pipe 50 and the strain acting on the pipe 50 at a region along the bending neutral axis of the pipe 50.

At step 203, the mass flow rate, i.e. the mass per unit time, of fluid flowing through the pipe 50 is determined. The mass flow rate is determined based on the determined bending force induced on the non-linear section of the pipe 50 due to the inertia of fluid flowing through the pipe 50.

At step 204, the pressure of the fluid flowing through the pipe 50 is determined. The pressure of the fluid flowing through the pipe 50 is determined based on the strain detected by the second strain gauge 72.

At step 205, the temperature of the fluid flowing through the pipe is determined. The temperature is determined by reference to the temperature sensor 73.

At step 206, the density of the fluid flowing through the pipe 50 is determined. The density of the fluid flowing through the pipe 50 is determined based on the temperature of the fluid determined at step 205 and the pressure of the fluid flowing through the pipe at step 204 with reference to a look-up table. The look-up table is stored by the storage unit 81.

At step 207, the volumetric flow rate of fluid flowing through the pipe 50 is determined. The volumetric flow rate of fluid flowing through the pipe 50 is determined based on the mass flow rate of fluid flowing through the pipe 50 determined at step 203 and the density of the fluid flowing through the pipe 50 determined at step 206.

Although a number of steps are provided above, it will be appreciated that one or more steps may be omitted.

Although in the above described method the volumetric flow rate is determined, it will be understood that alternative characteristics of the flow through the pipe 50 may be determined. For example, contaminants such as ice may be detected in the fluid flow. Ice in aviation fuel may cause severe problems, therefore it is advantageous to detect the presence of such contaminants. Such contaminants typically have a different density to the fluid. It have been realised that by detecting fluctuations in the bending force induced on the non-linear section of the pipe due to the fluctuations in the inertia of fluid flowing through the pipe, it is possible to determine the presence of contaminants in fluid flowing through the pipe.

Although the metering apparatus 60 comprises first and second strain gauges 61, 62 it will be understood that further strain gauges may be used.

In embodiments, the second strain gauge 72 may comprise two strain gauge elements spaced from each other. These two strain gauge elements are configured to each detect strain acting on the pipe 50. Each of these strain gauge elements of the second strain gauge are disposed on the neutral bending axis 54 of the pipe 50. By detecting the strain at two different regions on the neutral bending axis 54 of the pipe 50 it is possible to determine the pressure of the fluid in the pipe 50 based on the hoop strains, longitudinal strains and/or radial strains at two different regions. It is therefore possible for the controller to determine the direction of fluid flow along the pipe 50.

It will be understood that, with the embodiments described herein, the bending forces imparted due to the inertia of fluid flowing through the pipe 50 detected by the first strain gauge 71 will be zero when there is no flow through the pipe 50.

In the event that there is fluid in the pipe 50, but there is no flow of fluid along the pipe 50, the controller is able to determine the presence of fluid based on the information indicative of bending forces imparted due to the inertia of fluid flowing through the pipe 50 detected by the first strain gauge 71 detected by the first strain gauge 71 being zero, but information indicative the pressure of the fluid in the pipe 50 detected by the second strain gauge 72 being non-zero.

In embodiments in which the second strain gauge 72 comprises two strain gauge elements spaced from each other along the non-linear section of the pipe 50, the controller is configured to determine the direction of flow of fluid through the pipe 50 based on detected differences in pressure between the two strain gauge elements due to the pressure drop in the fluid resulting from the non-linear section of the pipe 50. That is, the higher reading determined by the controller will indicate the upstream strain gauge element of the second strain gauge 72.

It will be understood that fluid flow may occur in both directions along the pipe, and that the metring apparatus is able to determine fluid flow characteristics independent of the direction of flow.

Although the above described embodiments relate to liquid flow through a pipe, it will be understood that the invention is applicable to liquid or gaseous flow through a pipe. It will be understood by a skilled person that the potential fluid flow through the pipe must be sufficient to impart a detectable bending force on the non-linear section of the pipe and that the resolution of the strain gauges should be selected accordingly.

In the present embodiments, the metering apparatus is described with reference to high volumetric flow rate through a large diameter pipe. High volumetric flow rate is defined as a flow rate greater than or equal to 5 liters per minute. Large diameter pipe is defined as greater than or equal to 20 mm. However, it will be understood that the metering apparatus described herein may be applied to determining one or more characteristics of fluid having differing flow rates and differing diameter pipes.

Although the strain gauges above are electrical resistance strain gauges, it will be understood that alternative strain gauge arrangements may be used. For example, a semiconductor strain gauge or fibre optic strain gauge may be used.

Although the invention has been described above with reference to one or more preferred embodiments, it will be appreciated that various changes or modifications may be made without departing from the scope of the invention as defined in the appended claims.

The invention claimed is:

1. A metering apparatus for determining a characteristic of a fluid flowing through a non-linear section of a pipe, the metering apparatus comprising:
   a first strain gauge mountable to the non-linear section of the pipe offset from the bending neutral axis of the non-linear section of the pipe, configured to detect a strain indicative of a bending force on the non-linear section of the pipe induced by the inertia of the fluid flowing through the pipe, a second strain gauge mountable to the pipe on the bending neutral axis of non-linear section of the pipe, configured to detect at least one of the hoop strains, longitudinal strains and radial strains imparted on the pipe by the pressure of the fluid flowing through the pipe, a controller configured to determine the mass flow rate of fluid flowing through the pipe based on the bending force determined by the first strain gauge and the at least one of the hoop strains, longitudinal strains and radial strains determined by the second strain gauge.

2. The metering apparatus according to claim 1, wherein the controller is configured to determine the volumetric flow rate of fluid flowing through the pipe based on the determined mass flow rate of fluid flowing through the pipe and the density of the fluid flowing through the pipe.

3. The metering apparatus according to claim 1, wherein the controller is configured to determine the pressure of the fluid flowing through the pipe based on the at least one of the hoop strains, longitudinal strains and radial strains determined by the second strain gauge.

4. The metering apparatus according to claim 3, further comprising a temperature sensor, wherein the controller is configured to determine the density of the fluid flowing through the pipe based on the temperature detected by the temperature sensor and the pressure of the fluid flowing through the pipe.

5. The metering apparatus according to claim 1, wherein the first strain gauge is mountable to an outer surface of the pipe.

6. The metering apparatus according to claim 1, wherein the second strain gauge is mountable to an outer surface of the pipe.

7. The metering apparatus according to claim 1, wherein the first strain gauge comprises a first strain gauge element and a second strain gauge element.

8. The metering apparatus according to claim 7, wherein the first and second strain gauge elements are aligned in series along the longitudinal axis of the non-linear section of the pipe.

9. The metering apparatus according to claim 7, wherein the first and second strain gauge elements are spaced apart from each other.

10. The metering apparatus according to claim 1, wherein the fluid is a liquid, and optionally a fuel.

11. The metering apparatus according to claim 1, further comprising a user feedback arrangement, wherein the controller is configured to determine fluctuations in the mass flow rate of fluid flowing through the pipe and to operate the user feedback arrangement when fluctuations are determined.

12. The metering apparatus according to claim 1, further comprising a structural isolating arrangement configured to isolate the non-linear section of the pipe from external bending forces.

13. A fluid system further comprising the metering apparatus according to claim 1.

14. An aircraft further comprising the metering apparatus according to claim 1.

15. A method of determining a characteristic of a fluid flowing through a non-linear section of a pipe, comprising
determining the strain acting on the pipe at a region offset from the bending neutral axis of the pipe,
determining the strain acting on the pipe at a region along the bending neutral axis of the pipe,
determining the bending force induced on the non-linear section of the pipe due to the inertia of fluid flowing through the pipe based on the strain acting on the pipe at a region offset from the bending neutral axis of the pipe and the strain acting on the pipe at a region along the bending neutral axis of the pipe.

16. The method according to claim 15, further comprising determining the mass flow rate of fluid flowing through the pipe based on the bending force induced on the non-linear section of the pipe due to the inertia of fluid flowing through the pipe.

17. The method according to claim 16, further comprising determining the pressure of the fluid flowing through the pipe based on the strain acting on the pipe at a region along the bending neutral axis of the pipe.

18. The method according to claim 17, further comprising determining the volumetric flow rate of fluid flowing through the pipe based on the mass flow rate of fluid flowing through the pipe and the density of the fluid flowing through the pipe.

19. The method according to claim 18, further comprising determining the temperature of the fluid flowing through the pipe, and determining the density of the fluid flowing through the pipe based on the temperature of the fluid and the pressure of the fluid flowing through the pipe.

20. The method according to claim 15 further comprising determining fluctuations in the bending force induced on the non-linear section of the pipe due to the inertia of fluid flowing through the pipe, and determining the presence of contaminants in fluid flowing through the pipe based on fluctuations in the bending force induced on the non-linear section of the pipe due to the inertia of fluid flowing through the pipe.

* * * * *